Jan. 3, 1933.  F. T. HARDING  1,893,366
CONDENSER
Filed March 12, 1931   2 Sheets-Sheet 1

Inventor:
Franklin T. Harding

Jan. 3, 1933.  F. T. HARDING  1,893,366
CONDENSER
Filed March 12, 1931  2 Sheets-Sheet 2
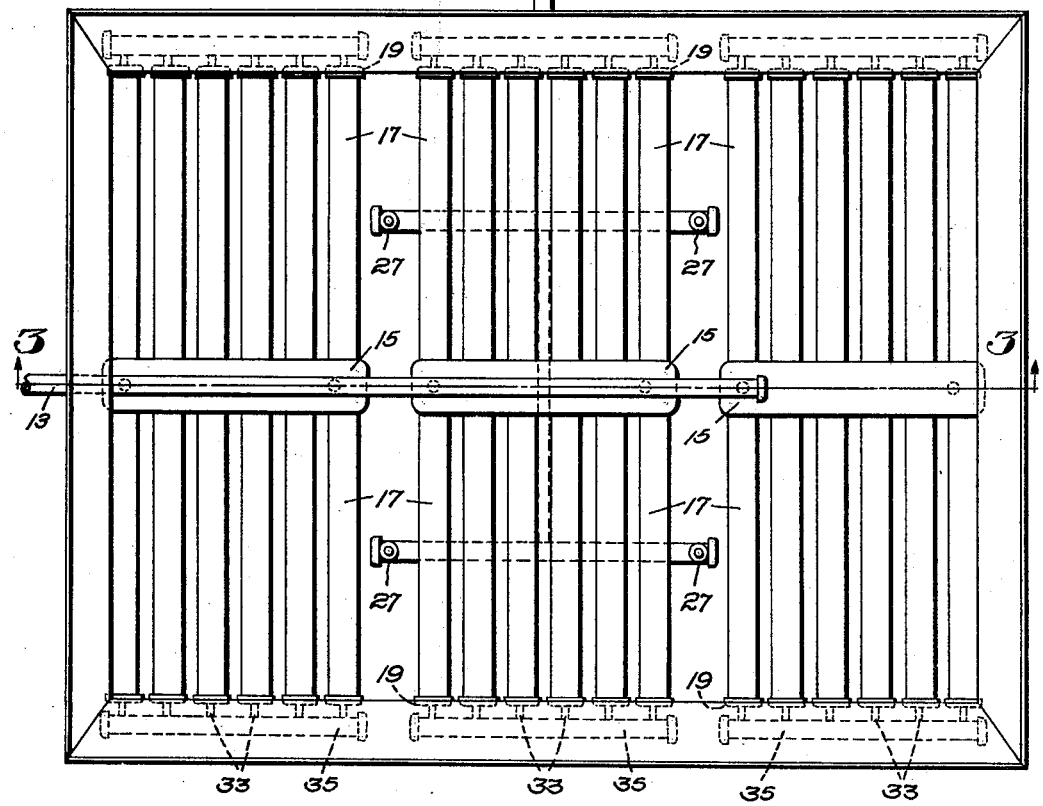
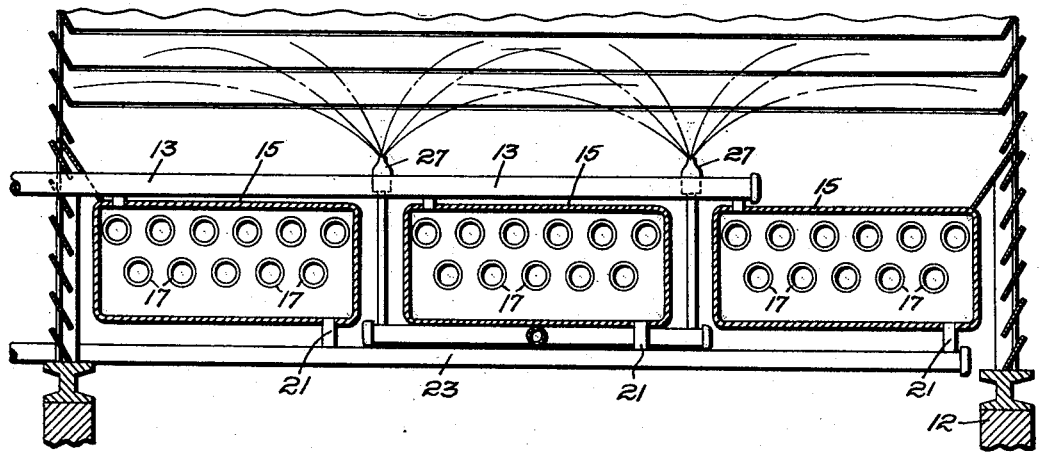
Inventor:
Franklin T. Harding
by Emery, Booth, Varney & Townsend
Attys Patented Jan. 3, 1933

1,893,366

UNITED STATES PATENT OFFICE

FRANKLIN T. HARDING, OF MELROSE, MASSACHUSETTS

CONDENSER

Application filed March 12, 1931. Serial No. 521,970.

This invention relates to surface condensers in which the heat transfer surfaces of one or more condensing units are exposed to the cooling effect of a cooling liquid for the purpose of condensing their gaseous contents.

The invention has, among other objects, the provision of a condenser of improved efficiency, compact structure, relatively simple and inexpensive to construct, install, maintain and repair, and presenting a condensing surface easy to clean.

The invention will be best understood by reference to the following description when taken in connection with the accompanying illustration of one specific embodiment thereof, while its scope will be more particularly pointed out in the appended claims.

In the drawings:

Fig. 2 is a plan view of the condenser shown in Fig. 1; and

Fig. 3 is a central, sectional elevation, taken on the line 3—3 in Fig. 2.

Figure 1:
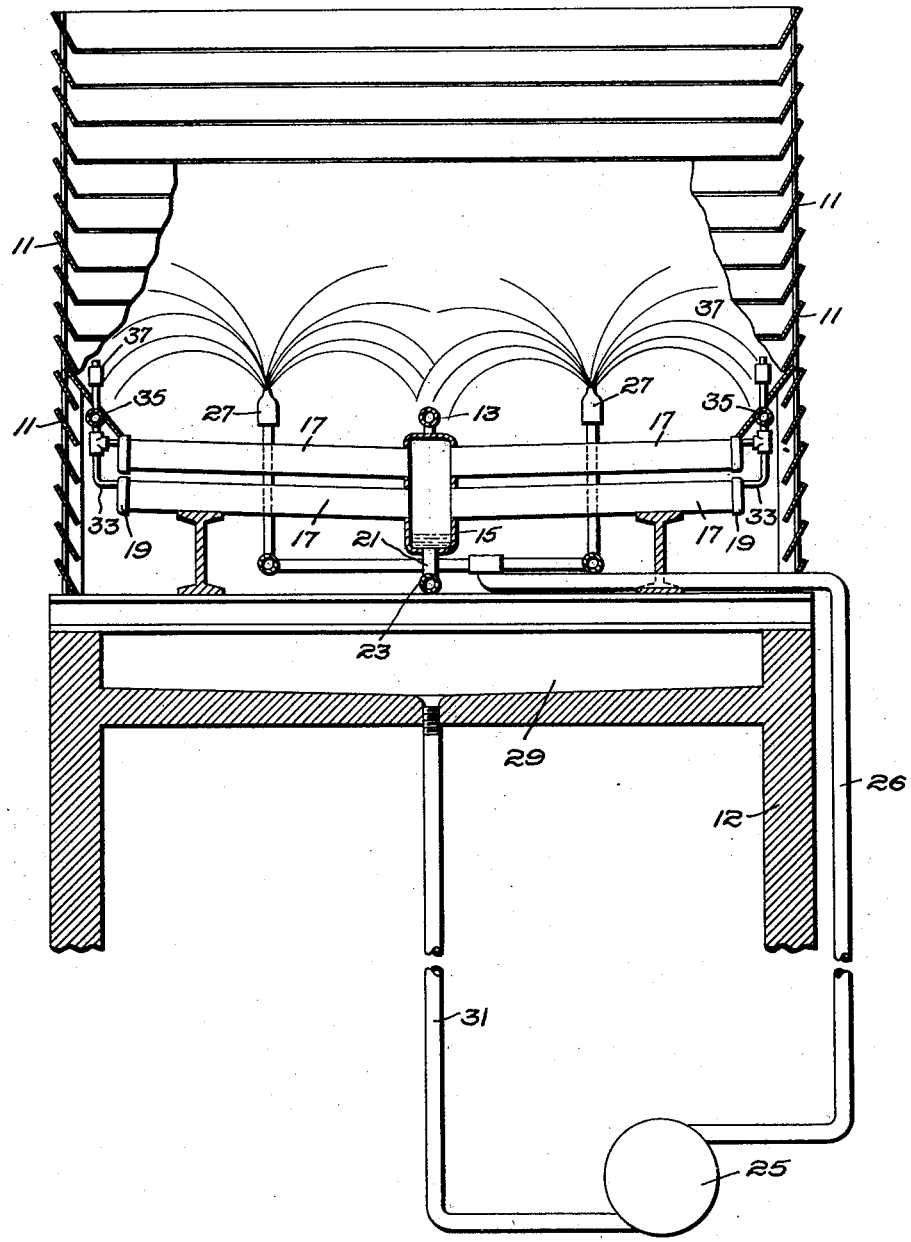
Fig. 1 is an end elevation, partly in section, showing a condenser embodying one form of the invention.

While the invention has application to various uses and to the condensation of a wide range of gases, for descriptive purposes it is herein shown as embodied in a form intended more particularly for the condensation of gaseous ammonia employed in connection with refrigerating plants.

Referring to the drawings and to the illustrative embodiment of the invention therein shown, the condenser is shown mounted in a cooling tower (Fig. 1) comprising a skeleton framework presenting a compartment having an open top, with sides protected by louvers or slats 11 which permit free circulation of air through the compartment but serve to deflect the cooling liquid downwardly and to prevent escape thereof from the compartment. The cooling tower may be mounted on the top or roof of the structure 12.

Gaseous ammonia is delivered to the condensing units through a supply pipe 13 to the upper part of one or more central headers 15, herein three in number, from each of which there extends laterally, and herein from each opposite side of the header, a plurality of dead-ended condensing pipes 17 of limited length, each in free communication with its header but having its outer end closed by a cap 19. As shown in the drawings, there are here provided six sets or nests of condensing pipes, two connected to each one of the central headers.

The condensing pipes preferably extend from the headers outwardly at a slight upward inclination from the horizontal, and are herein arranged (as best shown in Fig. 3) each set in two staggered tiers, the pipes in each tier being spaced from each other by a distance somewhat less than the outside diameter of each pipe, so that the upper surface of each individual pipe is directly exposed to the cooling liquid as the latter descends in spray form, each set of pipes being distributed in closely spaced relation across an area beneath the spray and presenting to such descending spray a substantially continuous barrier over said area. To withdraw the condensed ammonia, each header has a connection 21 at its bottom with a return pipe 23 by which the condensed liquid ammonia is drained from the header and carried away from the condenser and back to the receiver of the refrigerating system, which receiver (not shown) is located at a lower level.

The cooling liquid, which for descriptive purposes may be referred to as water, is supplied from a suitably located pump 25 (Fig. 1), through the supply main 26, and thence through suitable piping connection to one or more upright spray nozzles 27 located just above the upper tier of condensing pipes. The number and location of the nozzles depend on the area covered by the condensing units, but should be such as to provide for a descending water spray which will spread over and strike the entire pipe covered area. Herein four such nozzles are shown, located two on each opposite side of the central, vertical plane of the headers, and in the spaces between the inner and outer sets of condensing pipes. The water descends, and, in spray form, strikes directly the upper exposed surfaces of the pipes, forming a film which flows down over their sides and gravitates into a compartment 29 below the cooling tower, from which it is conveyed by the pipe 31 back to the pump 25.

In the operation of the condenser, the gaseous ammonia enters the upper part of each central header and is uniformly distributed therefrom to the opposite laterally extending nests of condensing pipes 17. As it condenses on the inner walls of each pipe, it accumulates in the bottom, and, due to the inclination of the pipes, flows back into the header without interfering with the further replenishing flow of gas from the header into the pipe. On entering the header it drains to the bottom thereof, also without interfering with the further flow of gas into and through the upper part of the same header, which flow is constantly taking place to replenish the condensing pipes, the condensation being withdrawn from the several headers through the pipes 21 and the connecting return pipe 23.

The condensing action of the cooling water is particularly effective, due to the fact that the water, further cooled by its discharge through the air circulating through the cooling tower, strikes the pipes in the first instance in finely divided or spray form under conditions where its cooling effect is at a maximum, and further due to the fact that each nest of condensing pipes, distributed laterally over and across a relatively broad area beneath the spray, presents thereto a substantially uninterrupted barrier of heat transfer surfaces in the form of the spaced and staggered condensing pipes. This distribution causes the spray to descend directly on all members of each set of pipes, forming a descending film on the sides of the pipes and enabling the air surrounding the pipes to further evaporate and cool the water while it is still on the metal surface. In the illustrated embodiment of the invention, furthermore, a substantially uniform condensing action is secured throughout the entire system, since each condensing pipe is free to receive interiorly substantially the same quantity of hot gas to be condensed and each unit of pipe length receives exteriorly and directly substantially the same amount of cold water spray.

The above results are not obtained in the common types of vertical coil condensers where water discharged from an overhead nozzle is usually first allowed to accumulate in bulk and then to flow down in succession over the various pipes of the coil, the water being warmed in its descent and progressively losing its effectiveness as it descends over successive pipes.

The condensing pipes may each be threaded into the side of the header so that the replacement of a pipe is easily made. The described arrangement of the headers and condensing pipes provides a simple and inexpensive condenser construction, easily assembled and maintained in repair, while the condensing surfaces of the pipe 17 are open and readily accessible for cleaning. Due to the unit character of this assemblage, condensers of larger and smaller capacity may be constructed by assembling different numbers of units of the same design.

In connection with the herein described condenser, there is also shown means for withdrawing uncondensable gases. In the case of ammonia used for refrigerating purposes, such gases may comprise air, decomposed ammonia and other impurities which should be withdrawn from time to time from the circulating system. When such uncondensable gases are present in the ammonia entering the headers and the pipes, they accumulate in the upper parts of the pipes and are gradually forced to the extreme end thereof. To separate and remove such gases, the extreme end of each pipe 17 near its top is connected by a small pipe 33 with a horizontal purge header 35 which is located above the condensing pipes so that the uncondensable gases may escape into the header and there accumulate. One purge header is provided for each lateral set of condensing pipes and each header is provided with a valve 37 through which the gases may be withdrawn from the header.

While I have herein shown and described for purposes of illustration one specific embodiment of the invention, it is to be understood that extensive deviations may be made therefrom, all without departing from the spirit thereof.

I claim:

1. A condenser having means for spraying a cooling fluid, a substantially horizontal central header, oppositely disposed sets of dead-ended condensing pipes extending laterally therefrom at a slight upward inclination, each set comprising an upper spaced series and a lower spaced series staggered with relation to the upper series, said pipes being distributed across an area beneath said spray, means for supplying a gaseous medium to the header, and means for withdrawing the condensed medium from the bottom of the header.

2. A condenser having means for spraying a cooling fluid, a substantially horizontal central header, oppositely disposed sets of condensing pipes extending laterally from said header and exposed directly to the spray from said nozzle and distributed in closely spaced relation across an area beneath said spray, means for supplying a gaseous medium to said pipes through said header, and means for withdrawing the condensed medium from the bottom of the header.

3. A condenser having a spray nozzle for discharging a cooling fluid, a substantially horizontal header, a series of spaced condensing pipes extending laterally from said header and distributed across an area beneath said spray, a second series of spaced, condensing pipes beneath and in staggered relation to said first series, means for supplying a gaseous medium to said pipes through said header, and means for withdrawing from the header the condensed medium.

4. A condenser having means for spraying a cooling fluid, a header, a series of dead-ended condensing pipes connected laterally to the header and distributed across an area beneath said spray, a second series of condensing pipes extending from said header beneath and in staggered relation to said first series, said pipes being disposed to receive directly said spray, means for supplying a gaseous medium for said pipes through the header, and means for withdrawing from the header the condensed medium.

5. A condenser having means for creating a spray of cooling fluid, a header, a series of condensing pipes connected laterally to said header, said pipes being distributed in closely spaced relation across an area beneath said spray and exposed to receive directly said spray, said pipes extending laterally from said header at a slight upward inclination, means for supplying a gaseous medium to said pipes through said header, and means for withdrawing from the header the condensed medium.

6. In a condenser, the combination with means for spraying a cooling fluid, of a substantially horizontal header, a series of dead-ended condensing pipes extending laterally from said header and distributed across an area beneath said spray, means for supplying a gaseous medium to said pipes through said header, and means for withdrawing the condensed medium from said header.

7. A condenser having means for creating a spray of cooling fluid, a supply header, a series of dead-ended condensing pipes connected laterally to said header, said pipes being distributed in closely spaced relation across an area beneath the spray and disposed to receive directly said spray, means for supplying a gaseous medium to said pipes through said header, and means for withdrawing from the header the condensed medium.

8. In a condenser, the combination with means for creating a spray of cooling fluid, of a header having a series of dead-ended condensing pipes extending laterally from said header at a slight upward inclination, and distributed across an area beneath said spray, and a purge header connected to the outer ends of said pipes.

9. In a condenser, the combination with means for creating a spray of cooling fluid, a condensing unit having heat transfer surfaces exposed to the cooling fluid, means for introducing a gaseous medium at one end of said unit, means for withdrawing the condensed medium from the same end thereof, and means to conduct the uncondensable gases from the opposite end of said unit.

10. A condenser having means for creating a spray of cooling fluid, a series of condensing pipes exposed directly to the spray, said pipes being distributed in closely spaced relation across an area beneath said spray, a common header connected to said pipes to supply thereto the gaseous medium to be condensed, and means for withdrawing from the header the condensed medium.

11. A condenser having means for spraying a cooling fluid, a plurality of condenser pipes having heat transfer surfaces, a common header to which said pipes are each connected and through which the gaseous medium to be condensed is supplied to said pipes, said pipes being distributed in closely spaced relation across an area substantially transverse to and covered by said spray and presenting to said spray through their heat transfer surfaces a substantially continuous barrier over said area, said pipes providing each a settling space for the accumulation and withdrawal of the condensed gaseous medium while leaving open a space for the continuous entrance of the said gaseous medium, means for supplying the gaseous medium to said header and distributing the same therethrough to said pipes and means simultaneously for withdrawing from the pipes the condensed gaseous medium whereby the several pipes of the condensers act with substantially equal efficiency in condensation and on substantially the same quantity of gas and deliver substantially the same quantity of condensed medium and a uniform condensation of maximum efficiency is effected throughout the series.

12. A condenser having means for spraying a cooling fluid, a common substantially horizontal header, a tier of spaced condensing pipes each separately connected to and extending from said header, said pipes being distributed across an area transverse to and covered by said spray, and a second tier of spaced pipes also separately connected to and extending from said header between the spray nozzle of said first tier but in staggered relation to the pipes of the latter, said pipes providing each a settling space for the accumulation and withdrawal of the condensed gaseous medium while leaving open a space for the continuous entrance of the said gaseous medium, means for supplying gaseous medium to said header and distributing the same therethrough to said pipes, and means simultaneously for withdrawing from the pipes the condensed gaseous medium whereby the several pipes of the condenser act with substantially equal effectiveness in condensation and a uniform condensation of maximum efficiency is effected throughout.

13. A condenser having means for creating a spray of cooling fluid, a common substantially horizontal header, a series of condensing pipes presenting heat transfer surfaces extending laterally from said header at a slight inclination, said pipes comprising an upper spaced series and a lower spaced series in staggered relation to said upper series whereby a gaseous medium to be condensed may be supplied to said header and distributed to said pipes, said series of pipes being distributed in closely spaced relation across an area substantially transverse to and covered by said spray, said pipes providing each a settling space for the accumulation and withdrawal of the condensed gaseous medium while leaving open a space for the continuous entrance of said gaseous medium from said header, means for supplying a gaseous medium to said header and distributing the same therethrough to said pipes and means simultaneously for draining from said pipes the condensed gaseous medium.

In testimony whereof, I have signed my name to this specification.

FRANKLIN T. HARDING.